Aug. 2, 1927.

H. A. HOUSTON

TRUCK STRUCTURE

Filed Oct. 10, 1925

1,637,342

WITNESSES:
A. G. Schiefelbein
M. B. Jaspert

INVENTOR
Harold A. Houston.
BY
Wesley G. Carr
ATTORNEY

Patented Aug. 2, 1927.

1,637,342

UNITED STATES PATENT OFFICE.

HAROLD A. HOUSTON, OF WILKINSBURG, PENNSYLVANIA, ASSIGNOR TO WESTINGHOUSE ELECTRIC & MANUFACTURING COMPANY, A CORPORATION OF PENNSYLVANIA.

TRUCK STRUCTURE.

Application filed October 10, 1925. Serial No. 61,715.

My invention relates to railway vehicle trucks, more particularly to supporting trucks of electrical railway vehicles in which the drive motors are embodied in the truck frame portion.

It is among the objects of my invention to provide a railway vehicle truck construction which shall be of simple and durable mechanical construction comprising a minimum number of parts that are so related and coordinated as to facilitate their assembly and ready accessibility.

Another object of my invention is to provide a railway vehicle truck of the above-designated character which shall embody a pair of drive motors as a portion of the truck frame and shall have pivotally connected thereto a frame member that is adapted to carry a journalled wheel axle.

Another object of my invention is to provide a vehicle truck structure embodying a pilot axle, a trailing axle and an intermediate idle axle which are so mounted and associated that they may readily coordinate to adjust themselves to the curvature of the rails upon which the vehicle operates.

Various forms of truck structures have been heretofore proposed which embody different means for mounting the drive motors on the truck frame or directly on the wheel axle and which provide different means for supporting the railway vehicle thereon.

My present invention contemplates a novel type of truck construction that embodies improved frame construction and supporting means for carrying the vehicle body with which it is associated. In effecting this object, I propose the use of a pair of drive motors which are respectively journalled on a wheel axle and secured in spaced relation by a pivotally connected frame portion, the motors and said connecting portion constituting the truck frame.

The motors are provided with integral bracket portions having recesses for receiving portions of a bolster frame, the bolster being provided with a center pin that is mounted for engagement with the vehicle body, the weight of which is carried by said bolster.

Figure 1:
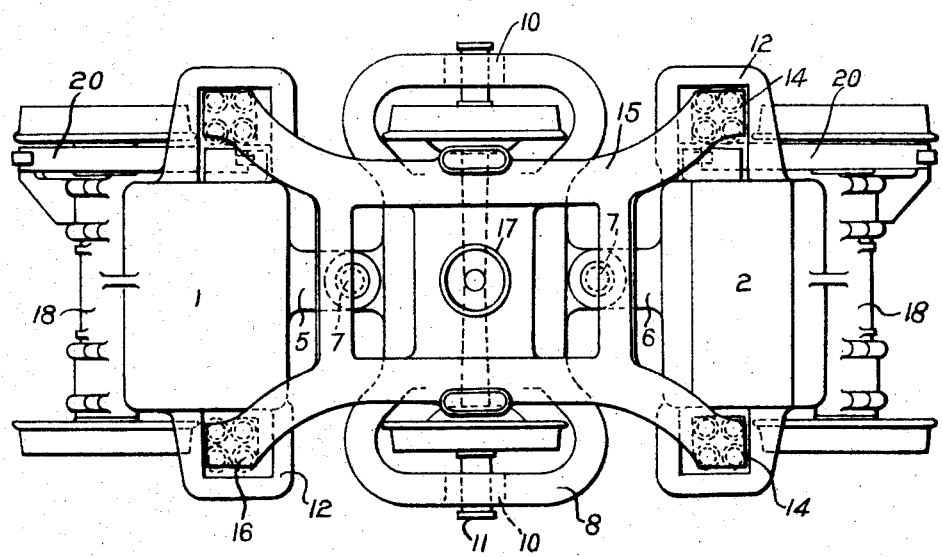
Figure 2:
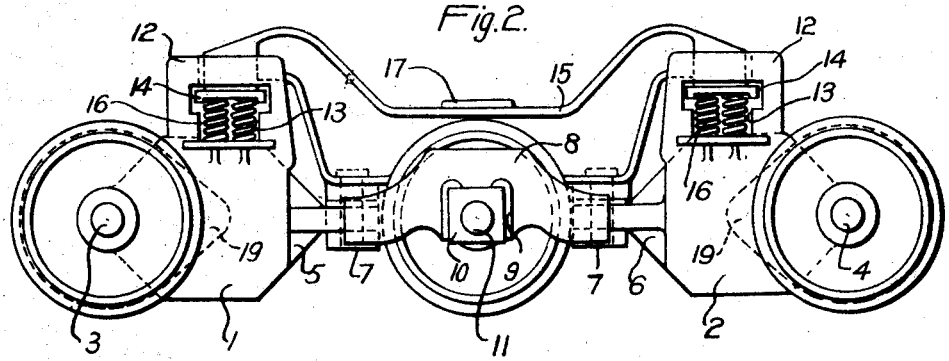

In the accompanying drawings, constituting a part hereof,

Fig. 1 is a top plan view of a railway vehicle truck embodying the principles of my invention, and Fig. 2 is a view in side elevation thereof.

Referring to the drawing, the structure therein illustrated comprises a pair of motors 1 and 2 having wheeled axles 3 and 4 respectively journalled therein and having their opposite sides 5 and 6 joined by pivotal connections 7 to a transversely extending frame member 8. The frame portion 8 is provided at its ends with windows 9 for receiving the usual journal boxes 10, in which an intermediate wheel axle 11 is journalled for rotation.

The motors 1 and 2 are respectively provided, at each end thereof, with vertically extending frame or bracket portions 12 having transverse slotted openings or recesses 13 therein for respectively receiving the four depending arms or end portions 14 of a bolster member 15. The bolster 15 is supported on the motor frames by means of coil springs 16 that are interposed between the respective end portions 14 and the motor frames. A center pin connection 17 is provided in the depressed central portion of the bolster member 15 to effect a connection with the vehicle body (not shown) that is carried or supported by the truck.

As clearly shown in the drawing, the motors 1 and 2 are journalled by axle housings 18 on the axles 3 and 4, respectively, between the wheels of the corresponding axles, and the axle members may be connected to the respective motor shafts 19 by gear trains (not shown) that are contained in gear cases 20, Fig. 1, in accordance with a well-known practice. The intermediate wheel axle 11 is journalled in the frame 8 at the outside of the wheels of said axle, the journal boxes 10 being provided at the ends of the axle 11 for this purpose.

The operation of the assembled truck structure is briefly as follows: The weight of the vehicle is supported on the center pin 17 of the bolster 15, which is supported on the coil springs 16 in the extending brackets 12 of the motor frames. This manner of supporting the load on the truck effects a substantially uniform distribution of the load on the axle members 3, 4 and 11 and, further, permits of transverse relative movement between the bolster 15 and the motor frames on which it is supported. The pivotal connection of the frame member 8 with the extended portions 5 and 6 of the motors 1 and 2 prevents chording of the truck on a curved track, which is an essential feature in the elimination of flange wear on the pilot and trailing axle wheels. The articulated frame constituting both motor frames and the connecting frame member 8 has freedom of motion that is unimpeded by excessive friction that might otherwise be caused by the load of the vehicle, inasmuch as the distribution of the weight on the motor housings eliminates, to a great extent, binding at the joints 7 of the motor frames and central frame.

It is evident from the foregoing description of my invention that railway vehicle trucks made in accordance therewith provide efficient and simple drive units for street railway or light traction service, and that the arrangement of the axles and the distribution of the load produces a steering action in the pilot axle and an idling function in the trailing axle member, which is free from restraint, while the vehicle follows the curvature of the rails.

Although I have described a specific embodiment of my invention, it will be obvious to those skilled in the art that various modifications may be made in the details of construction and in the size, proportion and relation of the several cooperating parts without departing from the principles herein set forth.

I claim as my invention:

1. The combination, in a railway vehicle truck, of a plurality of wheel axles, motors journalled on some of said axles, and a frame portion for journalling the other of said axles, said frame portion being supported by said motors.

2. The combination, in a railway vehicle truck, of a plurality of wheel axles, motors journalled on some of said axles, and a frame portion for journalling the other of said axles, said frame portion being yieldingly supported by said motors.

3. The combination, in a railway vehicle truck, of a plurality of wheel axles, motors journalled on some of said axles and a frame portion for journalling the other of said axles, said frame portion being yieldingly supported by said motors and adapted for movement relative thereto.

4. The combination, in a railway vehicle truck, of a plurality of wheel axles, motors journalled on some of said axles, and a frame portion for journalling the other of said axles, said frame portion being yieldingly supported by said motors and adapted for transverse movement relative thereto.

5. A railway vehicle truck comprising a plurality of wheel axles, motors journalled on some of said axles, a frame portion connecting said motors, a bolster for carrying the vehicle body, and means for supporting said bolster by said motors.

6. A railway vehicle truck comprising a plurality of wheel axles, motors journalled on some of said axles, a frame portion pivotally connecting said motors, a bolster for carrying the vehicle body, and means for supporting said bolster by said motors.

7. A railway vehicle truck comprising a plurality of wheel axles, motors journalled on some of said axles, a frame portion pivotally connecting said motors, a center pin bolster for carrying the vehicle body, and means for yieldingly supporting said bolster by said motors to provide relative transverse movement of said bolster and motors.

8. A railway vehicle truck comprising a plurality of wheel axles, motors journalled on some of said axles, a frame portion pivotally connecting said motors, a bolster for carrying the vehicle body, and means for supporting said bolster by said motors, said means comprising a plurality of spring brackets having transverse slots to provide movement of the bolster therein.

9. A railway vehicle truck comprising a pair of motors, a frame pivotally connected thereto, wheel axles respectively journalled in said motors and in said frame, a bolster mounted upon said motors and a center pin connection for said bolster to provide a pivotal mounting for the vehicle body.

10. A railway vehicle truck comprising a pair of motors, a frame pivotally connected thereto, wheel axles respectively journalled in said motors and in said frame, a bolster mounted in openings in the motor frames, and means for effecting pivotal mounting of the vehicle body upon said bolster.

11. A railway vehicle truck comprising a pair of motors, a frame pivotally connected thereto, a wheel axle journalled for rotation in each of said motors, another wheel axle journalled for rotation in said frame, a bolster yieldingly supported by said motors, and means for effecting a supporting connection between said bolster and the vehicle body.

In testimony whereof, I have hereunto subscribed my name this 28th day of September 1925.

HAROLD A. HOUSTON.